United States Patent
Greene et al.

(10) Patent No.: US 7,510,774 B2
(45) Date of Patent: Mar. 31, 2009

(54) SILICONE NON-STICK COATINGS

(75) Inventors: James D. Greene, Adrian, MI (US); Shana LaFayne Snyder, Adrian, MI (US)

(73) Assignee: Wacker Chemical Corporation, Adrian, MI (US)

(*) Notice: Subject to any disclaimer, the term of this patent is extended or adjusted under 35 U.S.C. 154(b) by 176 days.

(21) Appl. No.: 11/202,901

(22) Filed: Aug. 12, 2005

(65) Prior Publication Data

US 2006/0079620 A1 Apr. 13, 2006

Related U.S. Application Data

(60) Provisional application No. 60/601,213, filed on Aug. 13, 2004.

(51) Int. Cl.
*B32B 9/04* (2006.01)
*C08L 83/04* (2006.01)

(52) U.S. Cl. .................. 428/447; 428/428; 428/429; 428/450; 524/492; 524/493; 524/588; 524/424; 524/496; 524/445; 524/449; 525/477

(58) Field of Classification Search .................. None
See application file for complete search history.

(56) References Cited

U.S. PATENT DOCUMENTS

| 2,826,551 | A |   | 3/1958  | Geen |
|---|---|---|---|---|
| 4,028,339 | A |   | 6/1977  | Merrill |
| 4,477,517 | A | * | 10/1984 | Rummel ............ 428/324 |
| 4,681,908 | A | * | 7/1987  | Broderick et al. ........ 524/268 |
| 4,684,577 | A |   | 8/1987  | Coq |
| 4,895,766 | A | * | 1/1990  | Saad ................. 428/447 |
| 5,562,991 | A |   | 10/1996 | Tannenbaum |
| 5,691,067 | A | * | 11/1997 | Patel ................. 428/447 |
| 5,955,149 | A |   | 9/1999  | Kuziemka |
| 6,103,361 | A |   | 8/2000  | Batzar et al. |
| 6,123,999 | A |   | 9/2000  | Felix et al. |
| 6,133,359 | A |   | 10/2000 | Bate et al. |
| 6,245,431 | B1 | * | 6/2001 | Griswold et al. ........ 428/450 |
| 6,248,435 | B1 |   | 6/2001 | Leck |
| 6,261,985 | B1 |   | 7/2001 | Hsu |
| 6,277,487 | B1 |   | 8/2001 | Soda et al. |
| 6,403,105 | B1 | * | 6/2002 | Stein .................. 424/400 |
| 6,491,762 | B1 |   | 12/2002 | Bundy et al. |
| 6,586,535 | B1 |   | 7/2003 | Clark et al. |
| 6,592,977 | B2 |   | 7/2003 | Thomas et al. |
| 6,696,511 | B2 |   | 2/2004 | Robbins |
| 6,734,271 | B2 |   | 5/2004 | Reusmann |
| 6,761,964 | B2 |   | 7/2004 | Tannenbaum |
| 2001/0044019 | A1 |   | 11/2001 | Huesmann |
| 2003/0021988 | A1 |   | 1/2003 | Tannenbaum |
| 2003/0044619 | A1 |   | 3/2003 | Leech et al. |
| 2003/0049454 | A1 |   | 3/2003 | Araki et al. |

FOREIGN PATENT DOCUMENTS

GB 2 152 946 A * 8/1985

OTHER PUBLICATIONS

Handbook of Fillers, 2nd edition editied by Wypych, Chem-Tec Publishing 1999, Chapter 5, Table 5.5.*
Handbook of Filler, $2^{nd}$ Edition edited by Wypych, Chem-Tec Publishing 1999, Chapter 5, Table 5.2.*

* cited by examiner

*Primary Examiner*—Marc S Zimmer
(74) *Attorney, Agent, or Firm*—Brooks Kushman P.C.

(57) ABSTRACT

In at least one embodiment, the present invention relates to a silicone non-stick coating, products having these coatings, and methods for making the same. In at least one embodiment, the coating comprises the cured product of silicone resin, silicone fluid, and durability agent.

19 Claims, 4 Drawing Sheets

SILICONE NON-STICK COATINGS

CROSS-REFERENCE TO RELATED APPLICATIONS

This application claims the benefit of U.S. provisional application Ser. No. 60/601,213 filed Aug. 13, 2004.

BACKGROUND OF THE INVENTION

1. Field of the Invention

The present invention relates to silicone non-stick coatings, products having these coatings, and method for making the same.

2. Background Art

Non-stick coatings for articles such as cookware and bakeware are well known. Examples of materials that have been used to form non-stick coatings include, but are not necessarily limited to, fluorocarbon-based coatings such as Teflon, and silicone-based coatings containing silicone resins, elastomers, oils or silicone glazes. Teflon is often times used due to its durability (~3000 bakes) however the pans are only able to be re-coated once. Silicone elastomers tend to be used primarily where the dough is refrigerated and then baked due to resistance to thermoshock such as partially baked goods. They tend to also be used where substrates such as aluminum are being used which tend to be unable to withstand the curing conditions (600-700 F) for the Teflon type products such as the baguette pans. Typically, silicone elastomers can achieve ~2000-2500 bakes before needing to be re-coated. The removal of the elastomer can be relatively difficult and can require the handling and use of hazardous materials. The silicone glaze tends to be more economical to use than either the elastomer or Teflon type products. This material tends to be able to be used for about 400 bakes and can be relatively easily re-coated. Silicone glaze coated pans can typically be de-glazed using standard stripping solutions and can be re-coated several times before the pan becomes unusable. Even with the use of some of the conventional non-stick coatings, the users tend to still spray the pans with oil to help obtain acceptable release properties for bread. The oil can have a tendency to buildup in the pan and can cause burn out spots on the bread, forming surface defects in the product. The oil can also build up on the equipment, which will require cleaning.

SUMMARY OF THE INVENTION

At least one embodiment of the present invention pertains to a non-stick coating, such as for bakeware and cookware applications, which can be relatively easily removed. In at least one embodiment, the present invention can help prevent bread based products from sticking to pans after being baked or cooked.

Conventional technology has been used in bun pans and bread pans for release. In the former application, the bread products tend to be able to be baked approximately 400 times in a pan before having the pan recoated. The bread manufacturers have typically post added oil to the coating to increase the release properties. The pans in this case are returned for cleaning. In both of these situations the pans are returned to the applicator for de-glazing or stripping of the old coating and recoating with fresh material.

In at least one embodiment, the non-stick coatings of the present invention was found to have increased the release properties of baked goods (hamburger, hot dog buns, bread for example) from about 400 to at least 600 bakes, in other embodiments to at least 800 bakes, and in other embodiments, from 600-1,500 bakes, and in yet other embodiments from 675-1000 bakes, without compromising the de-glazing operation. The removal of the non-stick coatings of at least one embodiment of the present invention after reaching the expected service life was not any more difficult than conventional coatings to remove.

In at least one embodiment, the present invention comprises a non-stick coating composition comprising silicone resin, a silicone fluid, and a durability agent. In at least one embodiment, the silicone resin comprises one or more silicone resins. In at least one embodiment, the silicone fluid comprises a linear silicone fluid. In at least yet another embodiment, the composition can further comprise a second type of silicone resin. In at least yet another embodiment, the durability agent can comprise one or more types of solid particulate materials. In at least one embodiment, the composition further comprises solvents and catalysts.

In at least one embodiment, the silicone fluid used is a silanol functional linear polymer which can react with the other silicone resin(s) to increase the release properties. It is commonly understood that the use of silicone fluid linear polymer can increase surface defects in the film. These defects can be classified as fisheye, cratering and/or orange peel. However, it has been unexpectedly discovered by the present applicants that the inclusion of a durability agent, especially those with high oil absorption, with the silicone resin(s) and fluid in accordance with the present invention, can adsorb the fluid. This adsorbing effect can help eliminate the amount of free fluid in the coating (during the initial phase of drying), which decreases the amount of fluid available for causing surface defects while the coatings are still mobile. However, it is believed that the fluid is released upon baking and saturates the surface, resulting in a self oiling or time release mechanism that enables the coating to double the performance of the conventional technology, even without the use of a post oil. Furthermore, the use of durability agents allows a greater amount of silicone fluid to be used in the composition which is also believed to help contribute to at least doubling the performance of the coating relative to conventional technology. In at least one embodiment, the durability agent comprises at least one of iron oxide, platelet mica (MICA 325), carbon black, precipitated silica, fumed silica, and ceramic spheres (zeeospheres). In at least one embodiment, the durability agents have an average particle size of 0.01-25 microns, in other embodiments of 1-20 microns, and in yet other embodiments of 10-12 microns.

BRIEF DESCRIPTION OF THE DRAWINGS

The invention will now be described in greater detail in the following way of example only and with reference to the attached drawings, in which.

DETAILED DESCRIPTION OF THE PREFERRED EMBODIMENTS

Figure 1:
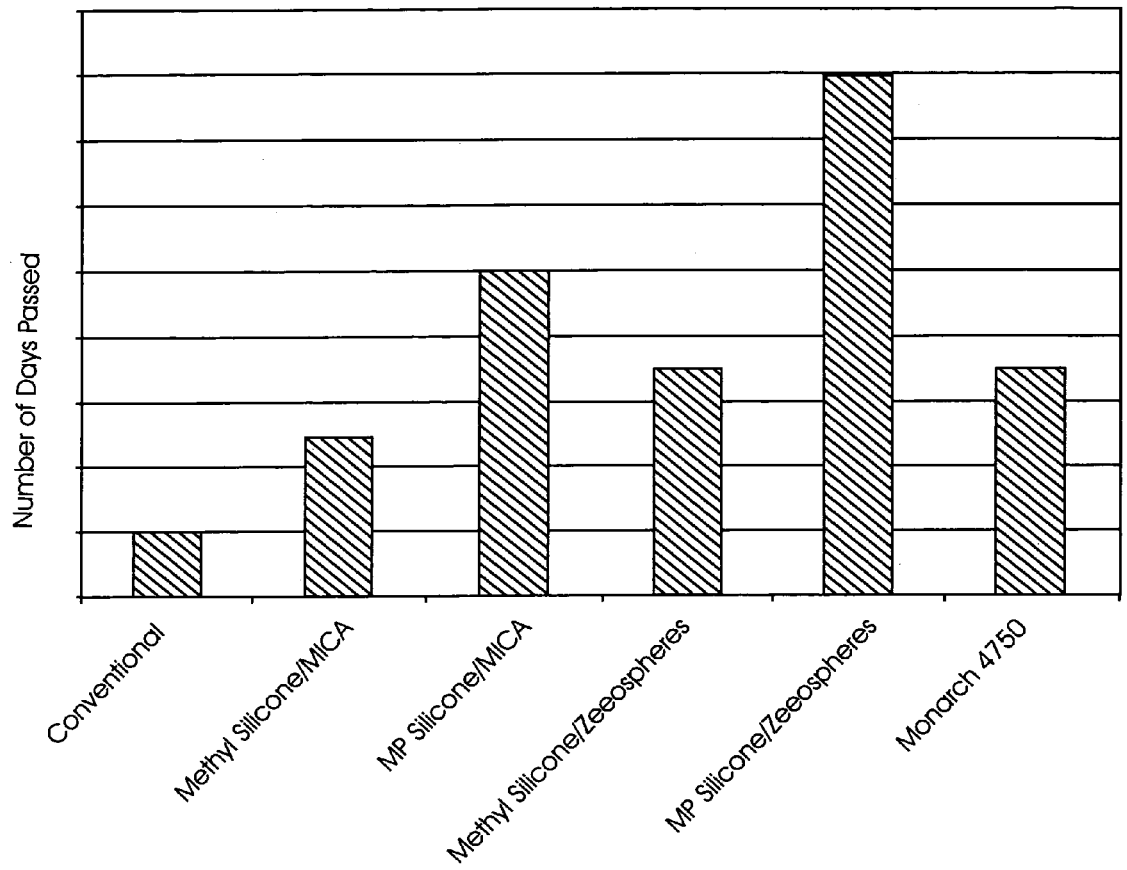
FIG. 1 is a table illustrating the results of an accelerated test procedure.

As required, detailed embodiments of the present invention are disclosed herein. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ aspects of the present invention. Moreover, except for otherwise expressly indicated, all numerical quantities in this description indicating amounts of material are to be understood as modified by the word "about" in describing the broadest scope of the invention. Practice within the numerical limit stated is generally preferred.

Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with at least one aspect of the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

In certain embodiments, the composition comprises, based on solids:

| Component | Wt % in one embodiment | Wt % in another embodiment | Wt % in yet another embodiment |
|---|---|---|---|
| Silicone Resin | 15-70 | 15-50 | 20-35 |
| Silicone Fluid | 0.25-20 | 0.5-10 | 1-5 |
| Durability Agent | 0.1-20 | 0.5-10 | 0.75-5 |
| Solvent | 0-90 | 10-80 | 15-60 |
| Catalyst | 0-15 | 0.01-5 | 0.1-1.0 |
| Rheological Additive | 0-5 | 0-3 | 0.05-1 |

The one or more silicone resins can comprise any suitable silicone resins. Examples of suitable silicone resins include, among others, suitable silicon resins, such as methyl-, ethyl-, propyl-, butyl-, hexyl-, phenyl-, vinyl, methyphenyl-, ($C_{1-10}$ resins), etc., and combinations thereof. In at least one embodiment, the resin may have a molecular weight of 1,000-750,000, in other embodiments from 5,000-100,000, and in yet other embodiments from 7,5000-25,000. In at least one embodiment, the silicone resin is a methyl resin or comprises at least 85% methyl resin constituents. The methyl silicone resin may be a solid flake methylpolysiloxane with silanol functionality. In at least one embodiment, the chemical composition of the silicone resin is 85-99% M1 and 1-15% M2, in other embodiments 95-99% M1 and 1-5% M2. In at least one embodiment, the silicone resin can be made directly from methyltrichlorosilan (98% by weight) and dichlorodimethylsilane (2%) and prepared through a hydrolysis reaction of the chlorosilane to form the silicone resin. In at least another embodiment, the silicone resin material comprises a flake resin with a Tg of 15-90° C., and in other embodiments of 20-75° C., and in yet other embodiments 35-55° C., and a melting point of between 15 and 75° C., and in other embodiments between 45 and 60° C. In at least one embodiment, the silicone resin comprises a methylpolysiloxane with silanol functionality and having a chemical composition of about 90-98% M1 and 2-10% M2. This resin, in at least one embodiment, is a flake resin having a Tg of ~45° C., a melting point of between 45 and 60° C., and a MW of about 10,000.

In at least one embodiment, the one or more silicone resins can comprise a second methyl resin. While any suitable second silicone resin can be employed, in at least one embodiment. The second methyl resin can be a solution of methylpolysiloxane with silanol functionality in xylene.

In at least one embodiment, the second methyl resin comprises a solution of methylpolysiloxane with silanol functionality in xylene. The chemical composition of the second methyl resin comprises about 85-93% M1 and 7-15% M2. It can be made from methyltrichlorosilan (85-93% by weight) and dichlorodimethylsilane (7-15%) prepared through a hydrolysis reaction of the chlorosilane to form the silicone resin. In at least one embodiment, the second methyl resin is a viscous liquid when all the solvents are stripped. The second methyl resin can be supplied in a 50% solution of xylene.

In at least one embodiment, the one or more silicone resins can comprise a phenylmethyl resin. The phenylmethyl resin can be used as the lone silicone resin or in combination with one or more other silicone resins, such as those mentioned above. In at least one embodiment, the phenylmethyl resin can comprise a solution of phenylmethylpolysiloxane with silanol functionality in xylene. In at least one embodiment, the resin concentration can be between 25-95% by weight. The silicone can be composed of phenyltrichlorosilane (50-85% by weight) and methyldichlorosilane (15-50%). The product can be hydrolyzed and can have a finished composition of 35-80% P1 and 20-65% M2 with silanol functionality of between 0.5-5.0. This product if stripped of all solvents would be a viscous liquid. The MW can be between 100-10,000.

In at least one embodiment, the phenylmethyl resin comprises a solution of phenylmethylpolysiloxane with silanol functionality in xylene. In at least one embodiment, the resin concentration is between 75-80% by weight. The phenyl methyl resin can comprise phenyltrichlorosilane (60-70% by weight) and methyldichlorosilane (30-40%). The product can be hydrolyzed to have a finished composition of 50-55% P1 and 45-50% M2 with ~1-5% silanol functionality. The phenylmethyl resin when stripped of all solvents is a viscous liquid. The phenyl methyl resin has a MW ~ of 1000-3000.

Any suitable silicone fluid may be used. In at least one embodiment, the silicone fluid comprises a linear silicone fluid. In at least one embodiment, the linear silicone fluid can comprise a silanol functional polydimethyl siloxane. In at least one embodiment, the silicone fluid has a MW of 1,000-800,000, in another embodiment of 10,000-250,000, and in yet another embodiment of 50,000-150,000. In at least one embodiment, the silicone fluid has a viscosity of 50-350,000 cps, in another embodiment of 1,000-100,000 cps, and in yet another embodiment 15,000-50,000 cps. Viscosity can be measured by a Haake viscometer at about 25° C. In at least one embodiment, the silicone fluid can be dimethyl fluid with silanol groups at each end of the polymer. In at least one embodiment, the functionality can be 0.05-2.0% OH groups, in another embodiment of 0.075-1.0% OH groups, and in yet another embodiment of 0.10-0.5% OH groups. Due to the use of the durability agent(s), a relatively high amount of silicone fluid can be used in the non-stick coating composition.

In at least one embodiment, the linear silicone fluid comprises an alpha and omega silanol functional polydimethyl siloxane with a viscosity of ~15,000-25,000 cps. The linear silicone fluid is a dimethyl fluid with silanol groups at each end of the polymer and has a functionality of about 0.1-0.3% OH groups.

In at least one embodiment, the durability agent comprises at least one or more of iron oxide, platelet mica (MICA 325), carbon black, precipitated silica, fumed silica, ceramic spheres (zeeospheres), clay, and other mineral-based extenders and pigments. In at least certain embodiments, the durability agent comprises particulate solids. In at least one embodiment, the durability agent has a relatively high surface area, resulting in a relatively high oil absorption capability.

In certain embodiments, the durability agent has an average particle size of:

| In one embodiment | In another embodiment | In yet another embodiment | In still yet another embodiment |
|---|---|---|---|
| 0.01-25 microns | 1-20 microns | 5-15 microns | 10-12 microns |

In certain embodiments, the durability agent has an average surface area size of:

| In one embodiment | In another embodiment | In yet another embodiment |
|---|---|---|
| 0.1-500 $m^2/g$ | 1-400 $m^2/g$ | 5-300 $m^2/g$ |

In certain embodiments, examples of suitable durability agents include, but are not limited to:

| MATERIAL | Average Particle Size | Average Surface Area | Density | Oil Absorption |
|---|---|---|---|---|
| Monarch Black 4750[1] | 50-400 nm (nanometers) | 25-500 $m^2/g$ | 1.7-1.9 g/cc | 45-330 cc/100 g material |
| Red Iron Oxide[2] Elements R 2199 D | 0.30 μm | 9 $m^2/g$ | 0.92 g/cc | 21 g/100 g material |
| 3M Zeeosphere W-210[3] | 1-12 μm | 5 $m^2/cc$ | 2.5 g/cc | 46 g/100 cc material |
| 3M Zeeosphere G-200[4] | 1-12 μm | 6 $m^2cc$ | 2.5 g/cc | 70 g/100 cc material |
| Minex 4[5] | 6.8 μm | 0.7 $m^2/g$ | 2.6 g/cc | — |
| Mica A325[6] | 16 μm | — | 2.66 g/cc | 25.4 g/100 cc material |
| Wacker HDK N20[7] | 10-50 nm | 200 ± 30 $m^2/g$ | 2.2 $g/cm^3$ | — |

*In some embodiments, with irregular shapes such as with mica, the shortest dimension should be less than 25 microns, and in other embodiments less than 15 microns.
[1] Available from Cabot Corporation.
[2] Available from Elementis.
[3] Available from 3M.
[4] Available from 3M.
[5] Available Unimin Corp.
[6] Available from Pacer Corp.
[7] Available from Wacker.

It should be noted that if the durability agent initially has a particle size that is too big, such as could be the case if provided as an agglomerate, the durability agents could be ground to the desired size, such as through the use of a horizontal mill or vertical mill, to form either the primary, or an aggregate form of sufficient size.

In at least one embodiment, the durability agent comprises two or more different particulate solid materials. In this embodiment, the different particular solid materials can be selected to achieve the desired physical property of the coating. In this embodiment, the durability agent could comprise a first solid particulate material having a high surface area and a second particulate solid material having a lower surface area or having another desired property. In certain embodiments, the second particulate material can be useful in extending the life cycle of the coating. In at least one embodiment, the durability agent comprises 10 to 90 weight percent first particulate material and 90 to 10 weight percent second particulate material, in other embodiments 30 to 70 weight percent particulate material and 70 to 30 weight percent second particulate material. In yet other embodiments 40 to 60 weight percent the first particulate material and 60 to 40 weight percent the second particulate material. In the above embodiments, the first particulate material may have a surface area of greater than 150 meters squared per gram while the second particulate material has an average surface area of less than 150 meters squared per gram.

In at least one embodiment, composition may also comprise a rheological (anti-settling) additive to help keep the composition from settling. Any suitable rheological additive and/or anti-settling agent can be used. In at least one embodiment, suitable rheological additives include Byk-additives. Suitable Byk-additives include polyhydroxy carboxylic acid amides, acrylics and clays.

In at least one embodiment, the silicone resin is composed of methyl substituents can comprise a methyl silicone resin. It is somewhat known in the art that the use of methyl silicone resins as binders for non-stick coatings can make the coating difficult to remove (de-glaze). The same, although typically to a lesser extent, can be true for phenyl silicone resins. The applicants have discovered that the use of the durability agent with silicone resins, such as methyl based systems, can disrupt the tightly held hydrophobic structure which enables the de-glazing materials to remove the coating.

To measure performance, an accelerated test procedure can be used. The accelerated test procedure was one that involved placing dough (bread and/or biscuit) on the panel and placing back in oven set at 450 F for 24 hours. The amount of dough stuck to the panel is recorded (2-3 cycles is equivalent to approximately 400 bakes). The coatings were cured at 400 F for 15 minutes. The results are shown in FIG. 1.

Figure 2:
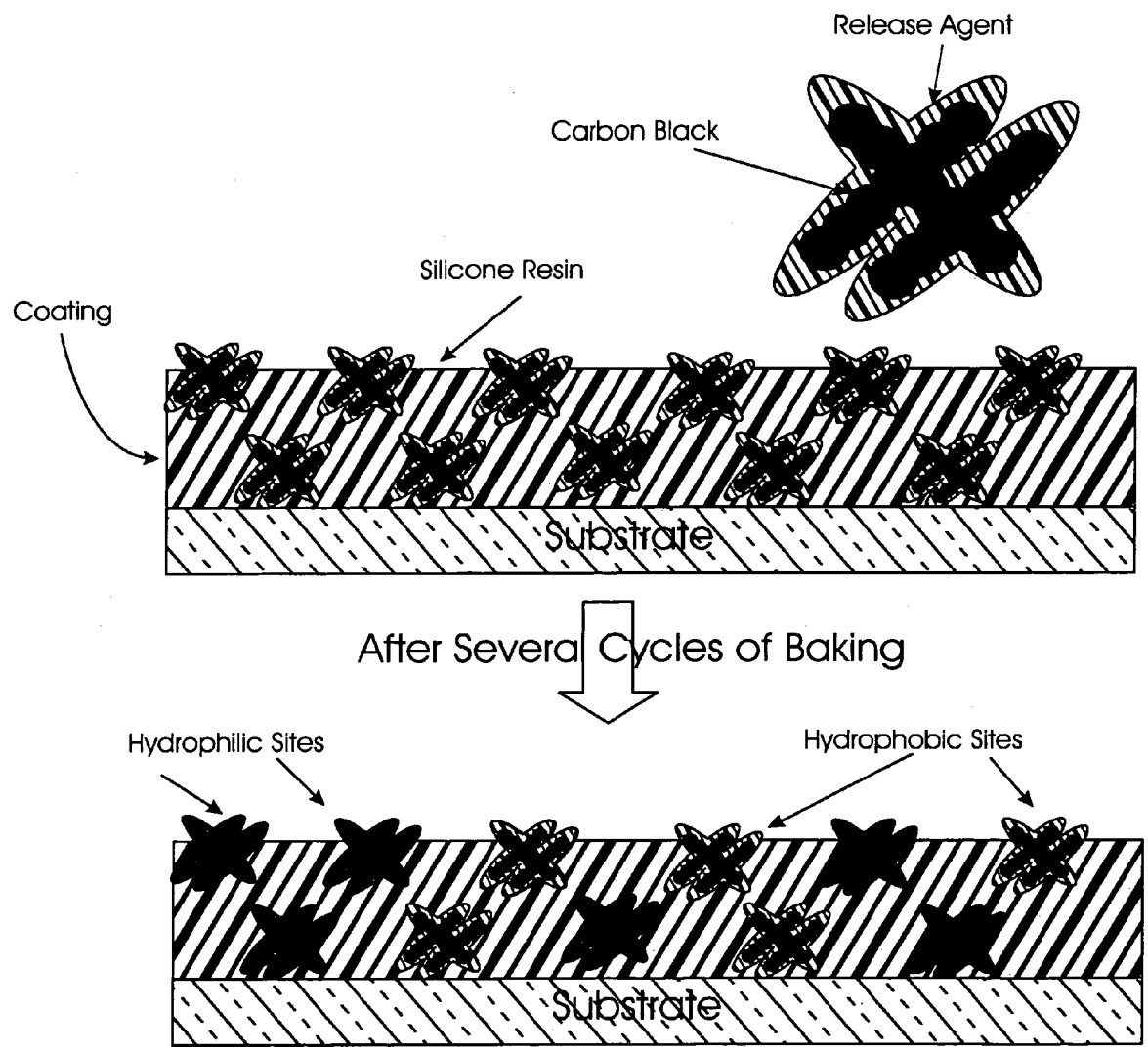
FIG. 2 is an illustration of a possible theory behind using a durability agent in accordance with the present invention.

FIG. 2 is an illustration of a possible theory behind using carbon black as the durability agent for increased release properties. It is believed that the use of carbon black can make it possible to increase the level of fluid by a factor of 15× in the coating.

Figure 3:
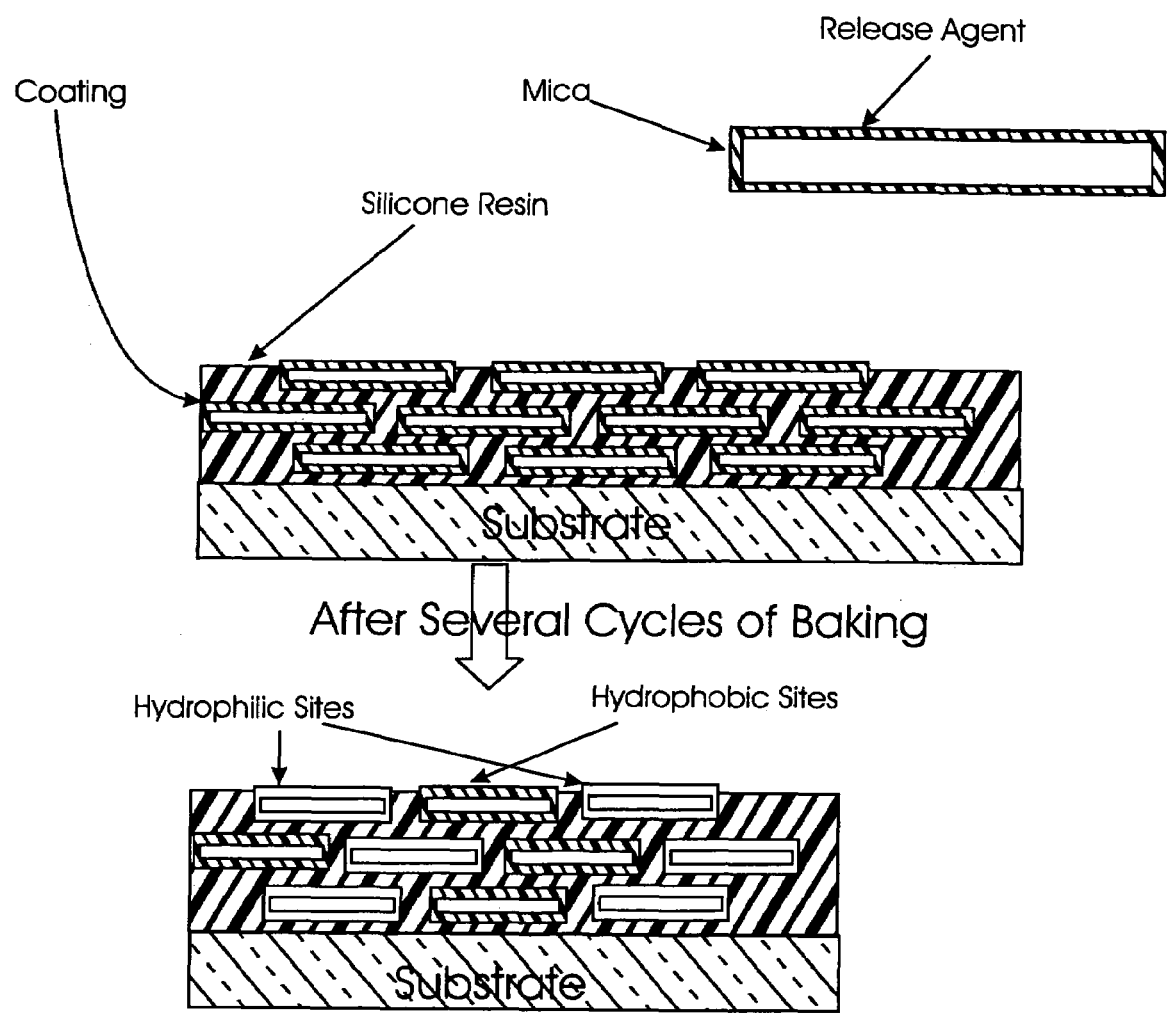
FIG. 3 is an illustration of a possible theory behind using a different durability agent in accordance with the present invention.

FIG. 3 is an illustration of a possible theory behind increased release properties due to Mica and release agent.

Figure 4:
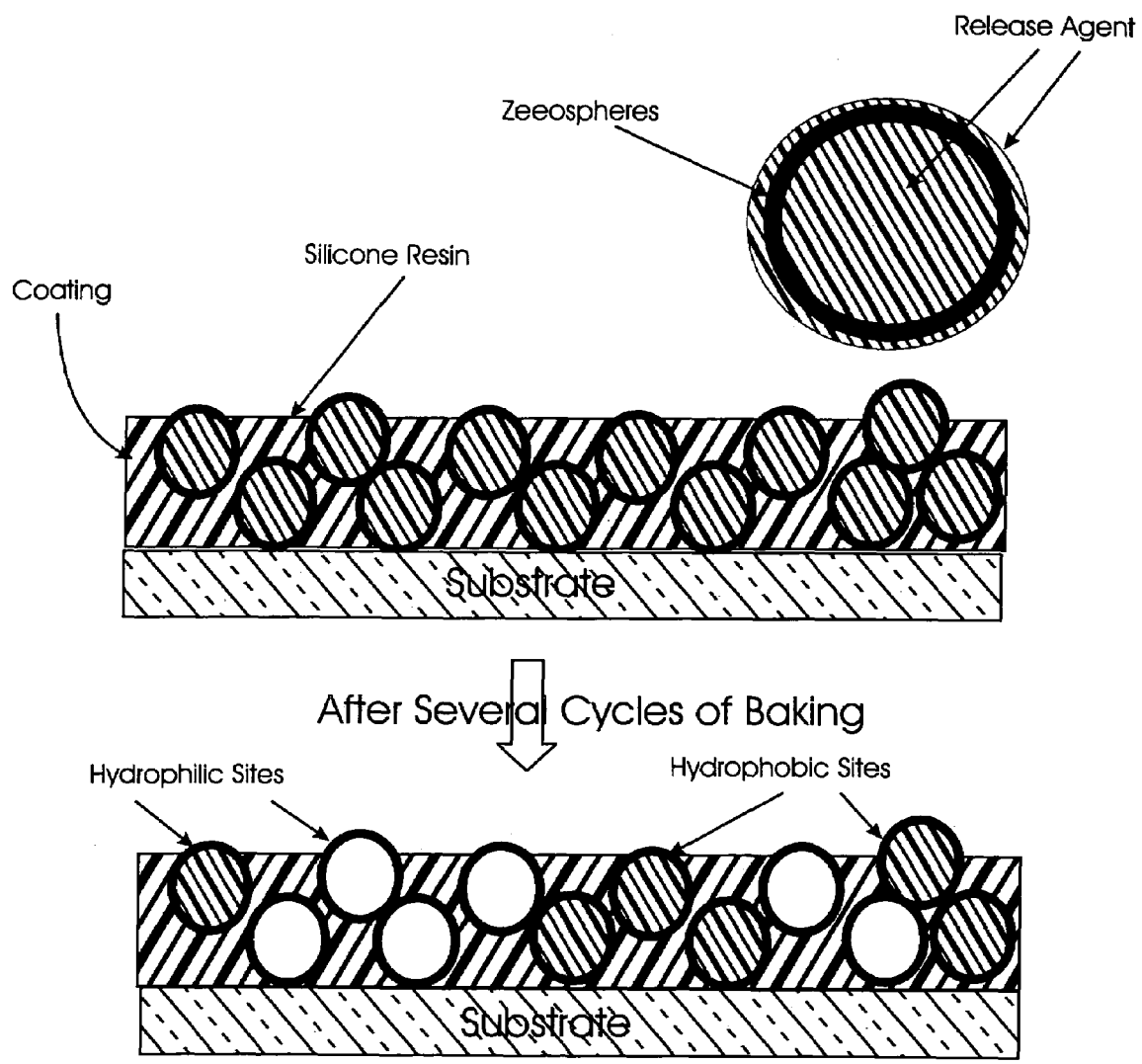
FIG. 4 is an illustration of a possible theory behind using yet another durability agent in accordance with the present invention.

FIG. 4 is an illustration of a possible theory behind increased release properties due to Zeeospheres and release agent. The hollow or solid inorganic particles have a smooth curved surface forming a texture. This decreases the amount of surface area available for bonding of the bread after the silicone oil is released.

Optionally, solvents may be used with the composition of the present invention. In at least one preferred embodiment, solvents are used to make the composition easier to use. In at least one embodiment, the solvent is an organic solvent or mixture of organic solvents, such as, for example, toluene, xylene, naphtha, propylene glycol monoethyl ether, and the like, preferably a mixture of at least two of the organic solvents.

Optionally, crosslinking agents may be used with the composition of the present invention. In at least one embodiment, crosslinking agents can help cure or crosslink the resin(s). Examples of suitable crosslinking agents include alkoxy functional silanes, titanates, zirconates, hydroxyl- and/or organo-functional monomers and/or polymers, and the like, and mixtures thereof.

In at least one embodiment, a catalyst can be used. Any suitable catalyst can be used. Examples of suitable condensation catalysts are lead compounds such as lead carbonate, basic lead carbonate, i.e., a compound corresponding to the formula $Pb_3(OH)_2(CO_3)_2$, lead monoxide, lead dioxide and lead naphthenate, as well as carboxylic acid salts of zirconium, calcium, aluminum, iron, zinc, tin, cobalt and/or cerium, such as zirconium-2-ethyl-hexoate, zinc naphthenate, zinc-2-ethylhexoate, tin octoate, dibutyltin diacetate, cobalt octoate, ferric naphthenate, calcium stearate, cobalt naphthenate, aluminum naphthenate, cerium octoate and cerium naphthenate; quaternary ammonium compounds such as tetramethylammoniumacetate; and metal alcoholates such as aluminum isopropylate- and polymeric butyltitanate. Mixtures of various condensation catalysts may also be employed. Pigments, reinforcing agents, and UV screens, etc. may also be added according to the skill of the art.

The coating compositions may be prepared by any suitable technique. Examples of suitable techniques are described in the examples below.

The coating may be applied to substrates, such as bakeware, by conventional methods, such as dipping, spraying, brushing or the like to a suitable cured thickness, such as one of at least about 0.1 mils. Thus, coating thickness of from about 1 to about 125 mil are possible. Following application, curing at elevated temperatures is preferred. Such further curing is normally accomplished by placing the coated bakeware in an oven maintained at a temperature of from about 50° C. to about 300° C. for about one minute to about three hours. The preferred cycle is 220° C. for one hour.

Bakeware on which the coating compositions herein is applied has an improved useful life, lasting an increased number of baking cycles. Thus, steel, aluminum, copper, plastic, etc., bakeware can be initially produced and reconditioned for greater use and longer life.

Products have non-stick finishes made using compositions of the present invention include cookware, bakeware, rice cookers and inserts therefor, water pots, iron sole plates, conveyors, chutes, roll surfaces, cutting blades, etc.

The practice of this invention may be further appreciated by consideration of the following, non-limiting examples, and the benefits of the invention may be appreciated by the examples set forth below.

EXAMPLES

The coatings are formulated by first grinding the durability agent(s) in a resin rich mixture considered the grind phase. The grinding can be done using a high speed dispersion mixer or a media mill such as a horizontal or vertical mill. The particle size of the durability agent(s) can be determined by a Hegman grind gauge. The reading should be >6.0 and in some embodiments about 7.0, which results in a maximum particle size of about 12.7 microns. The grind should be let down with the remaining solvents, catalyst, etc.

Example 1

The following is a clear release coating based on methyl silicone technology with 0.5% fumed silica used as the durability agent:

| Components | Wt. %, based on solids | Actual weight (g) |
|---|---|---|
| Methyl Resin[8] | 22.6 | 90.0 |
| Fumed Silica[9] | 0.52 | 2.17 |

[8]SILRES MK resin, available from Wacker.
[9]HDK N20 (having a surface area of 200 $m^2/g$), available from Wacker.

| Components | Wt. %, based on solids | Actual weight (g) |
|---|---|---|
| Toluene | 7.95 | 31.93 |
| Isobutyl isobutyrate | 13.2 | 52.98 |
| 6% iron ethylhexanoate | 0.36 | 1.47 |
| 8% zinc ethylhexanoate | 0.28 | 1.15 |
| Glycol Ether PM | 13.7 | 54.9 |
| VM&P Naphtha | 41.4 | 165.71 |
| Total | 100% | 401.11 |

1. Mix resins and fumed silica and isobutylisobytyrate (IBIB) together until homogenous.
2. Add toluene to step 1.
3. Add the Iron and zinc to step 2.
4. Add the Glycol Ether PM the same time of adding step 3.
5. Add the VM&P Naphtha to step 4.
6. Mix an additional 5-10 minutes until well blended.

Example 1A

Add 0.5% linear silicone fluid to example 1.

| Component | Actual Weight (g) |
|---|---|
| Example 1 | 50.0 |
| Linear silicone fluid[10] | 0.25 |

[10]Elastomer 20N, available from Wacker.

Mix in Dispermat for a few minutes.

Example 1B

Add 1% linear silicone fluid to example 1.

| Component | Actual Weight (g) |
|---|---|
| Example 1 | 50.0 |
| Linear silicone fluid[11] | 0.5 |

[11]Elastomer 20N, available from Wacker.

Mix in Dispermat for a few minutes.

Example 1C

Add 2% linear silicone fluid to example 1.

| Component | Actual weight (g) | Actual weight (g) |
|---|---|---|
| Example 1 | 50.0 | 50.21 |
| Linear silicone fluid[12] | 1.0 | 1.02 |

[12]Elastomer 20N, available from Wacker.

Mix in Dispermat for a few minutes.

Example 2

The following is a clear release coating based on methyl silicone technology with 1% fumed silica used as the durability agent:

| Components | Wt. %, based on solids | Actual weight (g) |
|---|---|---|
| Methyl silicone resin[13] | 22.5 | 90.92 |
| Fumed silica[14] | 1.03 | 4.13 |
| Toluene | 7.9 | 31.87 |
| Isobutyl isobutyrate | 13.14 | 52.86 |
| 6% iron ethylhexanoate | 0.36 | 1.46 |
| 8% zinc ethylhexanoate | 0.28 | 1.15 |
| Glycol Ether PM | 13.65 | 54.72 |
| VM&P Naphtha | 41.2 | 164.9 |
| Total | 100% | 402.01 |

[13]SILRES MK resin, available from Wacker.
[14]HDK N20 (having a surface area of 200 m²/g), available from Wacker.

1. Mix resins and fumed silica and isobutylisobutyrate together until homogeneous.
2. Add toluene to step one.
3. Add the Iron and zinc to step 2.
4. Add the Glycol Either PM the same time of adding step 3.
5. Add the VM&P Naphtha to step 4.
6. Mix for an additional 5-10 minutes until well blended.

Example 2A

Add 0.5% linear silicone fluid to example 2.

| Component | Actual weight (g) | Actual weight (g) |
|---|---|---|
| Example 2 | 50.0 | 50.45 |
| Linear silicone fluid[15] | 0.25 | 0.26 |

[15]Elastomer 20N, available from Wacker.

Mix in Dispermat for a few minutes.

Example 2B

Add 1% linear silicone fluid to example 3.

| Component | Actual weight (g) | Actual weight (g) |
|---|---|---|
| Example 2 | 50.0 | 50.66 |
| Linear silicone fluid[16] | 0.5 | 0.53 |

[16]Elastomer 20N, available from Wacker.

Mix in Dispermat for a few minutes.

Example 2C

Add 2% linear silicone fluid to example 2.

| Component | Actual weight (g) | Actual weight (g) |
|---|---|---|
| Example 2 | 50.0 | 50.58 |
| Linear silicone fluid[17] | 1.0 | 1.0 |

[17]Elastomer 20N, available from Wacker.

Mix in dispermat for a few minutes.

Example 3

The following is a clear release coating based on methyl silicone technology with 2% fumed silica used as the durability agent:

| Components | Wt. %, based on solids | Actual weight (g) |
|---|---|---|
| Methyl silicone resin[18] | 22.23 | 89.23 |
| Fumed silica[19] | 2.03 | 8.27 |
| Toluene | 7.82 | 31.37 |
| Isobutyl isobutyrate | 13.0 | 52.24 |
| 6% iron ethylhexanoate | 0.36 | 1.45 |
| 8% zinc ethylhexanoate | 0.27 | 1.1 |
| Glycol Ether PM | 13.52 | 54.37 |
| VM&P Naphtha | 40.8 | 163.33 |
| Total | 100% | 401.36 |

[18]SILRES MK resin, available from Wacker.
[19]HDK N20 (having a surface area of 200 m²/g), available from Wacker.

1. Mix resins and fumed silica and isobutylisobutyrate together until homogeneous.
2. Add toluene to step 1.
3. Add the Iron and zinc to step 2.
4. Add the Glycol Ether PM the same time of adding step 3.
5. Add the VM&P Naphtha to step 4.
6. Mix for an additional 5-10 minutes until well blended.

Example 3A

Add 1% linear silicone fluid to example 3.

| Component | Actual weight (g) |
|---|---|
| Example 3 | 50.0 |
| Linear silicone fluid[20] | 0.5 |

[20]Elastomer 20N, available from Wacker.

Mix in Dispermat for a few minutes.

Example 3B

Add 2% linear silicone fluid to example 3.

| Component | Actual weight (g) |
|---|---|
| Example 3 | 50.0 |
| Linear silicone fluid[21] | 1.0 |

[21]Elastomer 20N, available from Wacker.

Mix in Dispermat for a few minutes.

Example 3C

Add 3% linear silicone fluid to example 3.

| Component | Actual weight (g) |
|---|---|
| Example 3 | 50.0 |
| Linear silicone fluid[22] | 1.5 |

[22]Elastomer 20N, available from Wacker.

Mix in Dispermat for a few minutes.

Example 4

The following is a clear release coating based on methyl silicone technology with 3% fumed silica used as the durability agent:

| Components | Wt. %, based on solids | Actual weight (g) |
|---|---|---|
| Methyl silicone resin[23] | 22.0 | 88.61 |
| Fumed silica[24] | 3.02 | 12.3 |
| Toluene | 7.75 | 31.68 |
| Isobutyl isobutyrate | 12.9 | 51.8 |
| 6% iron ethylhexanoate | 0.35 | 1.43 |
| 8% zinc ethylhexanoate | 0.27 | 1.12 |
| Glycol Ether PM | 13.4 | 53.92 |
| VM&P Naphtha | 40.3 | 161.65 |
| Total | 100% | 402.51 |

[23]SILRES MK resin, available from Wacker.
[24]HDK N20 (having a surface area of 200 m$^2$/g), available from Wacker.

1. Mix resins and fumed silica and isobutylisobutyrate together until homogeneous.
2. Add toluene to step 1
3. Add the Iron and zinc to step 2.
4. Add the Glycol Ether PM the same time of adding step 3.
5. Add the VM&P Naphtha to step 4.
6. Mix for an additional 5-10 minutes until well blended.

Example 4A

Add 1% linear silicone fluid to example 4.

| Component | Actual weight (g) |
|---|---|
| Example 4 | 50.0 |
| Linear silicone fluid[25] | 0.5 |

[25]Elastomer 20N, available from Wacker.

Mix in Dispermat for a few minutes.

Example 4B

Add 2% linear silicone fluid to example 4.

| Component | Actual weight (g) |
|---|---|
| Example 4 | 50.0 |
| Linear silicone fluid[26] | 1.0 |

[26]Elastomer 20N, available from Wacker.

Mix in Dispermat for a few minutes.

Example 4C

Add 3% linear silicone fluid to example 4.

| Component | Actual weight (g) |
|---|---|
| Example 4 | 50.0 |
| Linear silicone fluid[27] | 1.5 |

[27]Elastomer 20N, available from Wacker.

Mix in Dispermat for a few minutes.

Example 5

The following is a clear release coating based on methyl silicone technology with 1% fumed silica and MICA used as the durability agent:

| Components | Wt. %, based on solids | Actual weight (g) |
| --- | --- | --- |
| Methyl silicone resin[28] | 21.875 | 87.96 |
| Fumed silica[29] | 1.0 | 4.07 |
| IBIB | 12.8 | 51.61 |
| Mica 325 | 0.59 | 2.37 |

[28]SILRES MK resin, available from Wacker.
[29]HDK N20 (having a surface area of 200 m$^2$/g), available from Wacker.

| Components | Wt. %, based on solids | Actual weight (g) |
| --- | --- | --- |
| Glycol Ether PM | 13.3 | 53.58 |
| Toluene | 7.7 | 30.97 |
| 8% zinc ethylhexanoate | 0.27 | 1.13 |
| 6% iron ethylhexanoate | 0.35 | 1.48 |
| VM&P Naphtha | 40.1 | 160.58 |
| Linear silicone fluid[30] | 3.0 | 12.19 |
| Total | 100.99 | 405.94 |

[30]Elastomer 20N, available from Wacker.

1. Mix together the silicone resin, fumed silica, Mica 325, linear silicone fluid and IBIB. Add Zirconium beads to get grind. (Mix until Hegman is a 6, i.e., maximum particle size of about 25 microns).
2. Add the Glycol Ether PM to the mixture.
3. Add toluene.
4. Add Zinc and iron.
5. Add the VM&P. Mix for an additional 15 minutes.

Example 6

The following is a clear release coating based on methyl silicone technology with 1% fumed silica and MICA used as the durability agent:

| Components | Wt. %, based on solids | Actual weight (g) |
| --- | --- | --- |
| Methyl silicone resin[31] | 10.9 | 43.95 |
| Methyl phenyl silicone resin[32] | 14.6 | 58.61 |
| Fumed silica[33] | 1.0 | 4.14 |
| IBIB | 12.8 | 51.71 |
| Mica 325 | 0.59 | 2.51 |
| Glycol Ether PM | 13.3 | 53.35 |
| Toluene | 7.7 | 30.92 |
| 8% zinc ethylhexanoate | 0.27 | 1.15 |
| 6% iron ethylhexanoate | 0.35 | 1.44 |
| VM&P Naphtha | 40.1 | 160.57 |
| Linear silicone fluid[34] | 3.0 | 12.22 |
| Total | 104.61 | 420.57 |

[31]SILRES MK resin, available from Wacker.
[32]SILRES SY 409, available from Wacker.
[33]HDK N20 (having a surface area of 200 m$^2$/g), available from Wacker.
[34]Elastomer 20N, available from Wacker.

1. Mix together the silicone resin, fumed silica, Mica 325, linear silicone fluid and IBIB. Add Zirconium beads to get grind. (Mix until Hegman is a 6, i.e., maximum particle size of about 25 microns). It should be understood that the zirconium beads used herein and through the examples only aid in the grinding and do not form any part of the composition.
2. Add the Glycol Ether PM to the mixture. A small amount of this can be added in step one to help get the mixture dissolved.
3. Add toluene.
4. Add Zinc and iron.
5. Add the VM&P. Mix for an additional 10-15 minutes until well blended.

Example 7

The following is a clear release coating based on methyl silicone technology with 1% fumed silica and talc used as the durability agents:

| Components | Wt. %, based on solids | Actual weight (g) |
| --- | --- | --- |
| Methyl silicone resin[35] | 21.875 | 87.84 |
| Fumed silica[36] | 1.0 | 4.12 |
| IBIB | 12.8 | 51.4 |
| Minex 4 (talc) | 0.59 | 2.48 |
| Glycol Ether PM | 13.3 | 53.33 |
| Toluene | 7.7 | 30.95 |
| 8% zinc ethylhexanoate | 0.27 | 1.11 |
| 6% iron ethylhexanoate | 0.35 | 1.51 |
| VM&P Naphtha | 40.1 | 161.15 |
| Linear silicone fluid[37] | 3.0 | 12.15 |
| Total | 100.99 | 406.04 |

[35]SILRES MK resin, available from Wacker.
[36]HDK N20 (having a surface area of 200 m2/g), available from Wacker.
[37]Elastomer 20N, available from Wacker.

1. Mix together the silicone resin, fumed silica, Minex 4, linear silicone fluid and IBIB. Add zirconium beads to grind. (Mix until Hegman is a 6, i.e., average particle size of about 25 microns).
2. Add the Glycol Ether PM to the mixture. A small amount of this can be added in step one to help get the mixture dissolved.
3. Add toluene.
4. Add Zinc and iron.
5. Add the VM&P. Mix for an additional 10-15 minutes until well blended.

Example 8

The following is a clear release coating based on methyl phenyl silicone technology with 1% fumed silica and talc used as the durability agents:

| Components | Wt. %, based on solids | Actual weight (g) |
|---|---|---|
| Methyl silicone resin[38] | 10.9 | 43.71 |
| Methyl phenyl silicone resin[39] | 14.6 | 58.57 |
| Fumed silica[40] | 1.0 | 4.18 |
| IBIB | 12.8 | 51.45 |
| Minex 4 (talc) | 0.59 | 2.51 |
| Glycol Ether PM | 13.3 | 53.3 |
| Toluene | 7.7 | 31.0 |
| 8% zinc ethylhexanoate | 0.27 | 1.19 |
| 6% iron ethylhexanoate | 0.35 | 1.49 |
| VM&P Naphtha | 40.1 | 160.71 |

[38]SILRES MK resin, available from Wacker.
[39]SILRES SY 409, available from Wacker.
[40]HDK N20 (having a surface area of 200 m$^2$/g), available from Wacker.

| Components | Wt. %, based on solids | Actual weight (g) |
|---|---|---|
| Linear silicone fluid[41] | 3.0 | 12.16 |
| Total | 104.61 | 420.27 |

[41]Elastomer 20N, available from Wacker.

1. Mix together the silicone resin, fumed silica, Minex 4, linear silicone fluid and IBIB. Add zirconium beads to grind. (Mix until Hegman is a 6, i.e., maximum particle size of about 25 microns).
2. Add the Glycol Ether PM to the mixture. A small amount of this can be added in step one to help get the mixture dissolved.
3. Add toluene.
4. Add Zinc and iron.
5. Add the VM&P. Mix for an additional 10-15 minutes until well blended.

Example 9

The following is a release coating based on methyl silicone technology with 1% fumed silica and black pigment used as the durability agents:

| Components | Wt. %, based on solids | Actual weight (g) |
|---|---|---|
| Methyl silicone resin[42] | 22.5 | 90.24 |
| Fumed silica[43] | 1.03 | 4.19 |

[42]SILRES MK resin, available from Wacker.
[43]HDK N20 (having a surface area of 200 m$^2$/g), available from Wacker.

| Components | Wt. %, based on solids | Actual weight (g) |
|---|---|---|
| 2.5% Monarch 4750 | 0.6 | 2.5 |
| Toluene | 7.9 | 31.71 |
| IBIB | 13.14 | 52.7 |
| 6% iron ethylhexanoate | 0.36 | 1.47 |

-continued

| Components | Wt. %, based on solids | Actual weight (g) |
|---|---|---|
| 8% zinc ethylhexanoate | 0.28 | 1.15 |
| Glycol Ether PM | 13.65 | 54.95 |
| VM&P Naphtha | 41.2 | 164.91 |
| Total | 100% | 403.82 |

1. Mix silicone resin, fumed silica, Monarch 4750 and IBIB until dispersed.
2. Add the Glycol Ether PM to step 1.
3. Add the Iron and Zinc to step 2.
4. Add the Toluene at the same time you add step 3.
5. Add the VM&P Naphtha to step 4.

Example 9A

Add 1% linear silicone fluid to example 9.

| Component | Actual weight (g) | Actual weight (g) |
|---|---|---|
| Example 9 | 50.0 | 50.54 |
| Linear silicone fluid[44] | 0.5 g | 0.57 |

Mix in Dispermat for a few minutes.
[44]Elastomer 20N, available from Wacker.

Example 9B

Add 2% linear silicone fluid to example 9.

| Component | Actual weight (g) | Actual weight (g) |
|---|---|---|
| Example 9 | 50.0 | 50.32 |
| Linear silicone fluid[45] | 1.0 | 1.07 |

[45]Elastomer 20N, available from Wacker.

Mix in Dispermat for a few minutes.

Example 9C

Add 3% linear silicone fluid to example 9.

| Component | Actual weight (g) | Actual weight (g) |
|---|---|---|
| Example 9 | 50.0 | 50.48 |
| Linear silicone fluid[46] | 1.5 | 1.57 |

[46]Elastomer 20N, available from Wacker.

Mix in Dispermat for a few minutes.

Example 10

The following is a release coating based on methyl silicone technology with 1% fumed silica and black pigment used as the durability agent:

| Components | Wt. %, based on solids | Actual weight (g) |
|---|---|---|
| Methyl silicone resin[47] | 10.9 | 43.82 |

[47]SILRES MK resin, available from Wacker.

| Components | Wt. %, based on solids | Actual weight (g) |
|---|---|---|
| Methyl silicone resin[48] | 21.875 | 87.63 |
| Fumed Silica[49] | 1.0 | 4.12 |
| Monarch 4750 | 0.59 | 2.49 |
| IBIB | 10.92 | 43.87 |
| Toluene | 6.57 | 26.38 |
| 8% zinc ethylhexanoate | 0.27 | 1.11 |
| 6% iron ethylhexanoate | 0.35 | 1.42 |
| Glycol Ether PM | 11.34 | 45.56 |
| VM&P Naphtha | 34.21 | 136.92 |
| Linear silicone fluid[50] | 3.0 | 12.1 |
| Total | 101.025 | 405.42 |

[48]SILRES KX, available from Wacker.
[49]HDK N20 (having a surface area of 200 m$^2$/g), available from Wacker.
[50]Elastomer 20N, available from Wacker.

1. Mix silicone resin, IBIB, fumed silica, Monarch 4750 and linear silicone fluid together. Add some Glycol Ether PM to help mixing. Mix for 30 minutes with zirconium beads to grind.
2. Add the rest of the Glycol.
3. Add toluene, zinc and iron to step #2 and mix for 5 minutes.
4. Add the VM&P and mix for 5 minutes.

Example 11

The following is a release coating based on methyl phenyl silicone technology with 1% fumed silica and black pigment used as the durability agent:

| Components | Wt. %, based on solids | Actual weight (g) |
|---|---|---|
| Methyl silicone resin[51] | 10.9 | 43.9 |
| Methyl phenyl silicone resins[52] | 14.6 | 58.82 |
| Fumed silica[53] | 1.0 | 4.05 |
| Monarch 4750 | 0.59 | 2.45 |
| IBIB | 12.8 | 51.92 |
| Toluene | 7.7 | 30.96 |
| 8% zinc ethylhexanoate | 0.27 | 1.1 |
| 6% iron ethylhexanoate | 0.35 | 1.44 |
| Glycol Ether PM | 13.3 | 53.66 |
| VM&P Naphtha | 40.1 | 160.95 |
| Linear silicone fluid[54] | 3.0 | 12.5 |
| Total | 104.61 | 421.75 |

[51]SILRES MK resin, available from Wacker.
[52]SILRES SY 409, available from Wacker.
[53]HDK N20 (having a surface area of 200 m$^2$/g), available from Wacker.
[54]Elastomer 20N, available from Wacker.

1. Mix silicone resin, fumed silica, Monarch 4750 and linear silicone fluid together. Add some Glycol Ether PM to help mixing. Mix for 30 minutes with zirconium beds to grind.
2. Add the rest of the Glycol.
3. Add toluene, zinc and iron to step #2 and mix for 5 minutes.
4. Add the VM&P and mix for 5 minutes.

Example 12

The following is a release coating based on methyl silicone technology with 1% fumed silica and red iron oxide pigment used as the durability agent:

| Components | Wt. %, based on solids | Actual weight (g) |
|---|---|---|
| Methyl silicone resin[55] | 21.875 | 87.7 |
| Fumed silica[56] | 1.0 | 4.14 |
| IBIB | 12.8 | 51.53 |
| Red Iron Oxide | 0.59 | 2.5 |
| Glycol Ether PM | 13.3 | 53.45 |
| Toluene | 7.7 | 30.93 |
| 8% zinc ethylhexanoate | 0.27 | 1.1 |
| 6% iron ethylhexanoate | 0.35 | 1.46 |
| VM&P Naphtha | 40.1 | 160.76 |
| Linear silicone fluid[57] | 3.0 | 12.24 |
| Total | 100.99 | 405.81 |

[55]SILRES MK resin, available from Wacker.
[56]HDK N20 (having a surface area of 200 m$^2$/g), available from Wacker.
[57]Elastomer 20N, available from Wacker.

1. Mix the silicone resin, fumed silica, Red Iron Oxide, linear silicone fluid and IBIB. Add zirconium beads to get grind. (Mix until Hegman is a 7, i.e., maximum particle size of about 12.7 microns).
2. Add the Glycol Ether PM to the mixture. A small amount can be added in step 1 to help with mixing if desired.
3. Add the toluene.
4. Add the Zinc and iron.
5. Add the VM&P. Mix for an additional 10-15 minutes until well blended.

Example 13

The following is a release coating based on methyl phenyl silicone technology with 1% fumed silica and red iron oxide pigment used as the durability agent:

| Components | Wt. %, based on solids | Actual weight (g) |
|---|---|---|
| Methyl silicone resin[58] | 10.9 | 43.95 |
| Methyl phenyl silicone resin[59] | 14.6 | 58.81 |
| Fumed silica | 1.0 | 4.07 |
| IBIB | 12.8 | 51.28 |
| Red Iron Oxide | 0.59 | 2.39 |
| Glycol Ether PM | 13.3 | 53.31 |
| Toluene | 7.7 | 30.85 |
| 8% zinc ethylhexanoate | 0.27 | 1.11 |
| 6% iron ethylhexanoate | 0.35 | 1.47 |
| VM&P Naphtha | 40.1 | 160.7 |
| Linear silicone fluid[60] | 3.0 | 12.17 |

[58]SILRES MK resin, available from Wacker.
[59]SILRES SY 409, available from Wacker.
[60]Elastomer 20N, available from Wacker.

| Components | Wt. %, based on solids | Actual weight (g) |
|---|---|---|
| Total | 104.61 | 420.11 |

1. Mix silicone resin, fumed silica, Red Iron Oxide, linear silicone fluid and IBIB. Add zirconium beads to get grind. (Hegman is a 7, i.e., maximum particle size of about 12.7 microns).
2. Add the Glycol Ether PM to the mixture.
3. Add the toluene.
4. Add the Zinc and iron.
5. Add the VM&P. Mix for an additional 10-15 minutes until well blended.

Example 14

The following is a release coating based on methyl silicone technology with 1% fumed silica and ceramic spheres used as the durability agent:

| Components | Wt. %, based on solids | Actual weight (g) |
|---|---|---|
| Methyl silicone resin[61] | 21.875 | 87.78 |
| Fumed silica[62] | 1.0 | 4.13 |
| IBIB | 12.8 | 52.59 |
| Ceramic spheres | 0.59 | 2.37 |
| Glycol Ether PM | 13.3 | 53.56 |

[61]SILRES MK resin, available from Wacker.
[62]HDK N20 (having a surface area of 200 m$^2$/g), available from Wacker.

| Components | Wt. %, based on solids | Actual weight (g) |
|---|---|---|
| Toluene | 7.7 | 31.11 |
| 8% zinc ethylhexanoate | 0.27 | 1.17 |
| 6% iron ethylhexanoate | 0.35 | 1.45 |
| VM&P Naphtha | 40.1 | 160.54 |
| Linear silicone fluid[63] | 3.0 | 12.1 |
| Total | 100.99 | 406.80 |

[63]Elastomer 20N, available from Wacker.

1. Mix the silicone resin, fumed silica, ceramic spheres, linear silicone fluid and IBIB, and use zirconium beads to get grind of 7 on Hegman grind gauge, i.e., maximum particle size of about 12.7 microns).
2. Add the Glycol Ether PM to the mixture.
3. Add the toluene.
4. Add the Zinc and iron.
5. Add the VM&P. Mix for an additional 10-15 minutes until well blended.

Example 15

The following is a release coating based on methyl silicone technology with 1% fumed silica and a ceramic spheres used as the durability agent:

| Components | Wt. %, based on solids | Actual weight (g) |
|---|---|---|
| Methyl silicone resin[64] | 10.42 | 54.5 |
| Phenylmethyl silicone resin[65] | 13.96 | 73 |
| Fumed silica[66] | 0.96 | 5 |
| IBIB | 12.24 | 64 |
| Ceramic spheres | 0.52 | 2.73 |
| Glycol Ether PM | 12.72 | 66.5 |
| Toluene | 7.36 | 38.5 |
| 8% zinc ethylhexanoate | 0.26 | 1.35 |
| 6% iron ethylhexanoate | 0.33 | 1.75 |
| VM&P Naphtha | 38.35 | 200.5 |
| Linear silicone fluid[67] | 2.87 | 15 |
| Total | 100.00 | 522.83 |

[64]SILRES MK resin, available from Wacker.
[65]SILRES SY 409, available from Wacker.
[66]HDK N20 (having a surface area of 200 m$^2$/g), available from Wacker.
[67]Elastomer 20N, available from Wacker.

1. Mix silicone resin, fumed silica, ceramic spheres, linear silicone fluid and IBIB and use zirconium beads to get a grind of 7 on Hegman grind gauge, i.e., maximum particle size of about 12.7 microns).
2. Add the Glycol Ether PM to the mixture.
3. Add the toluene.
4. Add the Zinc and iron.
5. Add the VM&P. Mix for an additional 10-15 minutes until well blended.

Each of the example coating compositions are applied to metal substrates and cured to form a 20-40 micron coating on the substrates. The flaking and cracking properties of the coatings are determined by ASTM D-772 and the appearance properties are determined visually. The release cycles are determined by the accelerated test procedure mentioned above. A control coating composition material including MP resin and a small amount of linear silicone fluid is also prepared and tested in a similar manner. The properties are displayed below in Table 1.

TABLE 1

Results of experiments.

| Example | MP Resin | M Resin | Linear Fluid | Fumed Silica | Release Cycles | Flaking | Cracking | Appearance |
|---|---|---|---|---|---|---|---|---|
| 1a |  | 22 | 0.5 | 0.5 | — | — | — | Fair |
| 1b |  | 22 | 1 | 0.5 | — | — | — | Bad |
| 1c |  | 22 | 2 | 0.5 | — | — | — | Bad |
| 2a |  | 22 | 0.5 | 1 | 3 | 10 | 10 | Good |

TABLE 1-continued

Results of experiments.

| Example | MP Resin | M Resin | Linear Fluid | Fumed Silica | Release Cycles | Flaking | Cracking | Appearance |
|---|---|---|---|---|---|---|---|---|
| 2b | | 22 | 1 | 1 | 3 | 10 | 10 | Good |
| 2c | | 22 | 2 | 1 | 3 | 10 | 10 | Good |
| 3a | | 22 | 1 | 2 | 4 | 6 | 6 | Good |
| 3b | | 22 | 2 | 2 | 5 | 8 | 10 | Good |
| 3c | | 22 | 3 | 2 | 5 | 8 | 10 | Good |
| 4a | | 22 | 1 | 3 | 2 | 2 | 2 | Good |
| 4b | | 22 | 2 | 3 | 2 | 2 | 2 | Good |
| 4c | | 22 | 3 | 3 | 2 | 8 | 8 | Good |
| Control | 22 | | 0.2 | | 2 | 10 | 10 | Good |

The release cycles of certain examples are shown below in Table II.

TABLE II

Results of experiments.

| Example | MICA 325 | Minex 4 | Monarch Black 4750 | Red Iron Oxide | Zeeospheres | Fumed silica | Linear fluid | Release Cycles |
|---|---|---|---|---|---|---|---|---|
| 5 | 0.6 | | | | | 1 | 3 | 5 |
| 6 | 0.6 | | | | | 1 | 3 | 10 |
| 7 | | 0.6 | | | | 1 | 3 | 8 |
| 8 | | 0.6 | | | | 1 | 3 | 8 |
| 9a | | | 0.6 | | | 1 | 1 | 3 |
| 9b | | | 0.6 | | | 1 | 2 | 6 |
| 9c | | | 0.6 | | | 1 | 3 | 7 |
| 10 | | | 0.6 | | | 1 | 3 | 4 |
| 12 | | | | 0.6 | | 1 | 3 | 8 |
| 14 | | | | | 0.6 | 1 | 3 | 10 |
| 15 | | | | | 0.5 | 1 | 3 | 16 |

The appearance, pencil hardness, steam test and gloss of certain examples are determined and displayed in Table 3 below. Pencil hardness is determined by ASTM D 3363-74. Steam test is a visual inspection of a coated panel for coating deformation after exposure to steam for at least one hour. Gloss is determined by ASTM D 523-89.

TABLE III

Physical Properties of formulations:

| Example | Appearance | Pencil Hardness | Steam Test | Gloss (60°) |
|---|---|---|---|---|
| 5 | Fair | 2H | Pass | 42 |
| 6 | Good | 2-3H | Pass | 24 |
| 14 | Fair | 2H | Pass | 28 |
| 15 | Good | 2-3H | Pass | 48 |
| Conventional system | Good | 2H | Pass | 80 |

The addition of durability agents enable formulators the ability to increase the level of release agent silicon fluid and maintain good appearance. This in effect makes it possible to formulate a coating for cookware applications which, in at least some embodiments, will last at least 2-3 times as long as conventional coatings.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-stick coating comprising the cured product of silicone resin, silicone fluid, and an inorganic durability agent, wherein the coating is prepared from a composition comprising of 0.1 to 20 weight percent durability agent, based on the total solids of the composition, wherein the durability agent comprises a first durability agent and a second durability agent, different from the first durability agent, the composition further comprising 15 to 70 weight percent silicone resin, and 0.25 to 20 weight percent silicone fluid, based on the total solids of the composition, wherein the silicone fluid contains silanol groups.

2. The coating of claim 1 wherein the durability agent comprises a solid particulate material.

3. The coating of claim 2 wherein the durability agent has an average particle size of 0.01-25 microns.

4. The coating of claim 3 wherein the durability agent has an average surface area of 0.1 to 500 meters squared per gram.

5. The coating of claim 1 wherein the durability agent is selected from group consisting of iron oxide, platelet mica, carbon black, precipitated silica, fumed silica, ceramic spheres, and clay.

6. The coating of claim 1 wherein the coating is prepared from a composition comprising 15 to 50 weight percent silicone resin, 0.5 to 10 weight percent silicone fluid, and 0.5 to 10 weight percent durability agent.

7. A non-stick coating composition comprising silicone resin, a silanol containing silicone fluid and a durability agent having an average surface area of 0.1 to 500 meters squared per gram, wherein the durability agent comprises a first durability agent having a first average particle size and a second durability agent, different from the first durability agent, having a second average particle size, less than the first average particle size and wherein the durability agent is selected from group consisting of iron oxide, platelet mica, carbon black, precipitated silica, fumed silica, ceramic spheres, clay and other mineral-based extenders and pigments, wherein the composition comprises 15 to 70 weight percent silicone resin, 0.1 to 20 weight percent silicone fluid, and 0.1 to 20 weight percent durability agent, based on the total solids of the composition.

8. The coating of claim 1, wherein the first durability agent has a first average particle size and the second durability agent has a second average particle size, less than the first average particle size.

9. The coating of claim 1, wherein the silicone fluid has a MW of 1,000 to 800,000.

10. The coating of claim 1, wherein the silicone fluid has a MW of 50,000 to 150,000.

11. The coating of claim 1, wherein the silicone fluid has a viscosity of 15,000 to 50,000 cps.

12. The coating of claim 1, wherein the silicone fluid has a functionality of 0.075 to 1.0 percent OH groups.

13. The coating of claim 1, wherein the silicone fluid comprises an alpha and omega silanol functional polydimethyl sioxane.

14. The coating of claim 13, wherein the sioxane has a viscosity of ~15,000 to 25,000 cps.

15. The coating of claim 1, wherein the first durability agent has a surface area of greater than 150 m²/g and the second durability agent has a surface area of less than 150 m²/g.

16. A non-stick bakeware product comprising a bakeware having a cooking surface, and a non-stick coating covering at least a substantial portion of the cooking surface, the coating comprising the cured product of a composition comprising silicone resin, silicone fluid containing silanol and a solid inorganic durability agent, wherein the durability agent comprises a first durability agent having a first average particle size and a second durability agent, different from the first durability agent, having a second average particle size, less than the first average particle size, wherein the coating is prepared from a composition comprising 15 to 70 weight percent silicone resin, 0.1 to 20 weight percent silicone fluid, and 0.1 to 20 weight percent durability agent.

17. A method of making a non-stick bakeware, said method comprising: providing a bakeware having a cooking surface, and depositing a non-stick coating over at least a substantial portion of the cooking surface, the coating comprising the cured product of silicone resin, a silanol containing silicone fluid and a durability agent having an average surface area of 0.1 to 500 meters squared per gram and wherein the durability agent is selected from group consisting of iron oxide, platelet mica, carbon black, precipitated silica, fumed silica, ceramic spheres, and clay, wherein the composition comprises 15 to 70 weight percent silicone resin and 0.25 to 20 weight percent silicone fluid based on the total solids of the composition.

18. A non-stick coating comprising the cured product of silicone resin, a silanol containing silicone fluid, and an inorganic durability agent, wherein the coating is prepared from a composition comprising of 0.1 to 20 weight percent durability agent, based on the total solids of the composition, wherein the durability agent comprises a first durability agent having a first average particle size and a second durability agent, different from the first durability agent, having a second average particle size, less than the first average particle size wherein the durability agent comprises a solid particulate material wherein the durability agent has an average particle size of 0.01-25 microns and wherein the durability agent comprises a first durability agent having a first average particle size and a second durability agent, different from the first durability agent, having a second average particle size, less than the first average particle size, wherein the composition comprises 15 to 70 weight percent silicone resin and 0.25 to 20 weight percent silicone fluid based on the total solids of the composition.

19. A non-stick coating comprising the cured product of silicone resin, a silanol containing silicone fluid, and a durability agent, wherein the coating is prepared from a composition comprising of 0.1 to 20 weight percent durability agent, 15 to 70 weight percent silicone resin, and 0.25 to 20 weight percent silicone fluid, based on the total solids of the composition, and wherein the durability agent comprises a first durability agent having a first average particle size and a second durability agent, different from the first durability agent, having a second average particle size, less than the first average particle size.

* * * * *

UNITED STATES PATENT AND TRADEMARK OFFICE
CERTIFICATE OF CORRECTION

PATENT NO.        : 7,510,774 B2
APPLICATION NO. : 11/202901
DATED             : March 31, 2009
INVENTOR(S)       : James D. Greene et al.

It is certified that error appears in the above-identified patent and that said Letters Patent is hereby corrected as shown below:

Column 23, Line 30, Claim 13:

Delete "sioxane" and insert -- siloxane --.

Column 23, Line 31, Claim 14:

Delete "sioxane" and insert -- siloxane --.

Signed and Sealed this

Second Day of June, 2009

JOHN DOLL
*Acting Director of the United States Patent and Trademark Office*